Sept. 10, 1968      T. S. GREEN      3,400,782
CLOSE SUBSURFACE SEISMIC PROFILING SYSTEM
Filed Dec. 22, 1966      2 Sheets-Sheet 1
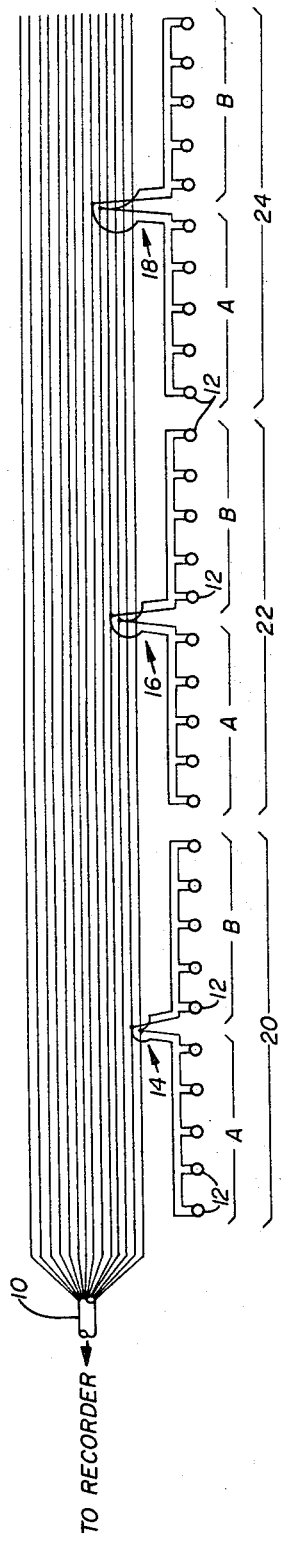
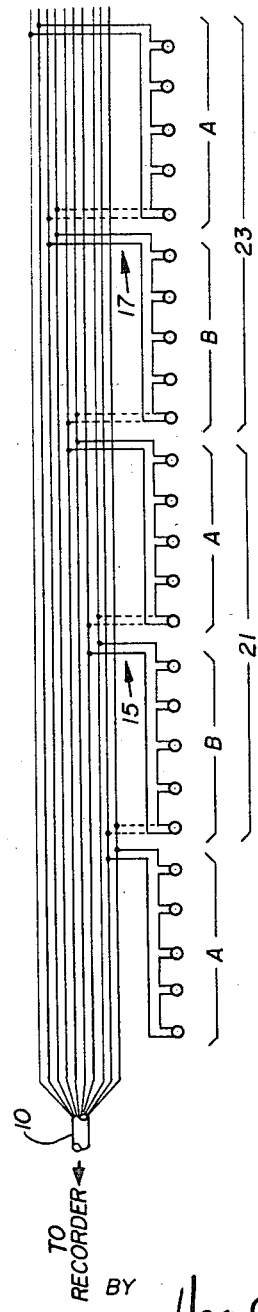
INVENTOR.
T. S. GREEN
BY *Head & Johnson*
ATTORNEYS

3,400,782
CLOSE SUBSURFACE SEISMIC PROFILING SYSTEM
Theodore S. Green, 2919 E. 70th Court,
Tulsa, Okla. 74105
Filed Dec. 22, 1966, Ser. No. 603,894
7 Claims. (Cl. 181—.5)

ABSTRACT OF THE DISCLOSURE

A method of achieving a greater amount of subsurface profiling information in seismic surveying by switching effective geophone spread locations to obtain a synthetic readout without physical movement thereof. The method permits the utilization of typical seismic geophone patterns in conjunction with two separate shots at each given, and usually further spaced, shot points. An additional embodiment discloses a method of achieving closely spaced subsurface profiling or depth points by not only utilizing the first embodiment but also changing the location of subsequent shot holes relative to the fixed geophone locations.

Summary

This invention has as its object the provision of a new and improved method for obtaining close depth point coverage during seismic profiling operations by utilizing a double set of take-out information from the geophone cable. One half of the typical geophone pattern is connected for normal take-out information, the other half being hooked into an intermediate take-out with the resultant halves paralleled at a recording truck for a first shot or seismic impulse as is normally used. Thereafter by means of a plugging or switching arrangement the intermediate take-out is thereafter paralleled with the take-out half in another direction and after a second seismic impulse from the same shot point or hole, a separate set of depth points results. Thusly, this invention provides a means for obtaining closely spaced depth points by techniques unique to the seismic industry in a simple and economical manner than has been heretofore accomplished.

An additional object of this invention is to provide even further close subsurface seismic profiling and depth points by variably spacing the subsequent shot holes relative to fixed geophone patterns when overlapping spreads are used.

These and further objects of this invention will become more apparent upon further reading of the specification and claims when taken in conjunction with the accompanying drawings of which:

FIGURE 1 is a partial view describing a geophone hook-up system as typically used in seismic survey.

FIGURE 2 is a partial view depicting the seismic geophone spread electrical hook-up commensurate with this disclosure.

Detailed description

Figure 3:
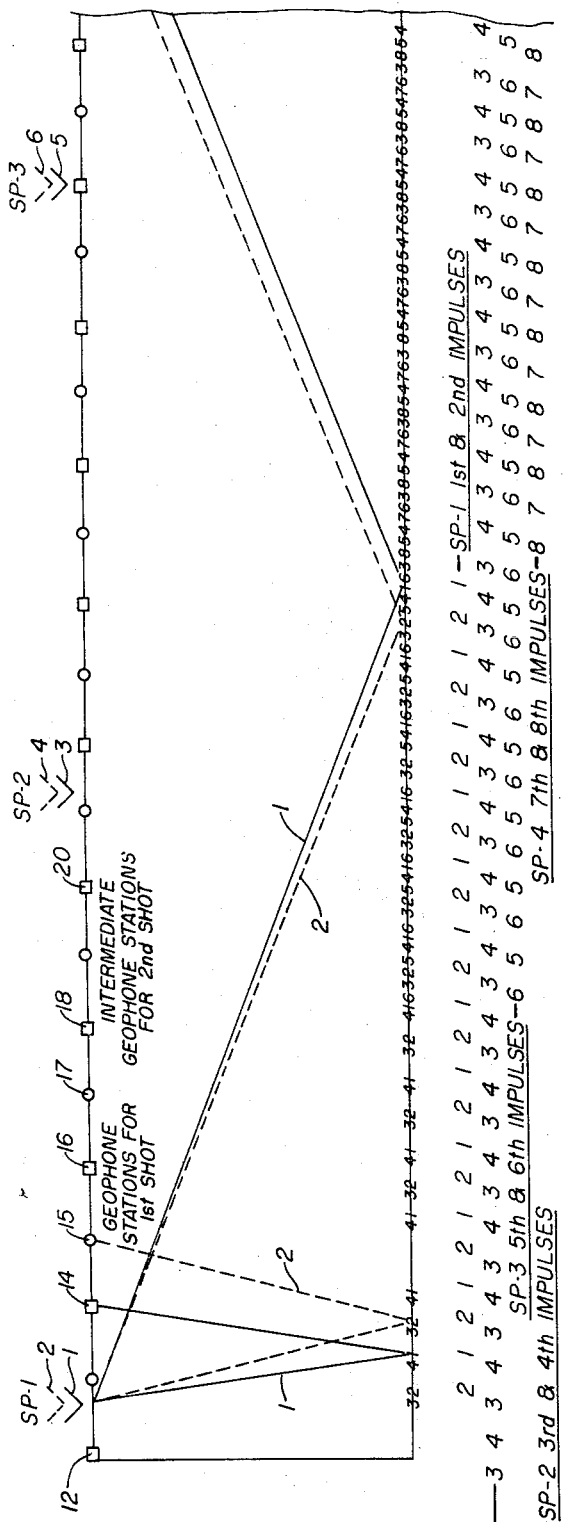
FIGURE 3 is a schematic representation of the process of this invention describing the relationship between shot points, actual and effective geophone location to obtain close subsurface coverage.

Referring now to FIGURE 1, a typical geophone connection arrangement and array is depicted. A multi-lead geophone cable 10 extends from a recording truck, not shown, along the ground surface in a straight line. At suitable intervals are a plurality of geophones or detectors 12. Spaced at preferably equal positions along the cable and connectable thereto are a plurality of geophone stations 14, 16, and 18, respectively shown. At each respective station a desired geophone pattern or array 20, 22, and 24 is positioned along a given direction. Each array includes a specific pattern of a plurality of geophones 12 divided into groups identified as A and B. The detectors employed may be dynamic geophones, variable reluctance geophones, or other transducers of conventional design capable of translating seismic wave energy into electrical currents which can subsequently be amplified, recorded, combined and corrected as necessary and desired. Depending upon the type of geophones employed the instruments are to be properly coupled with the earth's surface.

As shown in FIGURE 1, groups A and B are connected to each other in a parallel relationship wherein the series summation of the pickup from geophones in group A is paralleled with the summation of the pickup signals received at geophones 12 in group B with the resultant signal being recorded in the usual and well known manner at the recording truck not shown. The record may be a magnetic tape or other well known device for recording the amplified signals from each geophone array. For example, recorders which produce visual or graphic records are also inclusive of use with this invention, many of which are known and widely utilized. Such recorders as oscillograph recorders, variable area recorders, and variable density recorders or those devices which produce records indicating changes in signal frequency rather than or in addition to changes in signal amplitude may also be employed.

In the modification of the geophone groups as shown in FIGURE 2 suitable switching means is provided at the recording truck wherein geophone groups B and A are combined to form patterns or arrays 21, 23 and etc. That is, geophone station 15 and 17 are in effect synthetic stations for the purposes of this system when the geophone groups are switched to provide an effective parallel connection with the next adjacent group. For example, geophone group B and the next adjacent geophone group A are combined by a switching operation at the recording truck. The overall effect being that a resultant signal is now received and synthesized to provide a signal which effectively results at ground station 15, 17, etc.

Referring now to FIGURE 3 a typical method of operation of the systems of this invention is depicted in diagrammatic form. The geophone pattern or array of substantially equi-distant geophone stations 14, 16, 18, etc. are laid out along the ground preferably in a straight line. Desired shot points (SP–1, SP–2, SP–3, etc.) wherein seismic impulses are to be initiated, are assigned. Such impulses may be generated by the detonation of explosive charges in shot holes drilled below the surface of the earth, by the dropping of weights or by means of vibrator or similar devices positioned at the shot points. While the geophone arrays are connected as described in FIGURE 1 a first seismic impulse is generated which is shown as the numeral 1 as a solid line. The reflected signal from the shot point is received at the various geophone stations by a summation of the signals received at group A paralleled with those received at group B causing an electrical impulse to be received at the field recording device. Such a resultant signal is received for each subsequent station identified in the drawing by the square boxes 14, 16 and 18, etc., within the limits relative to the size of seismic impulse and its capable travel through the earth's surface. Immediately after the recording of the reflected impulse energy as detected by geophones 12, the operator, by an appropriate electrical switching operation, will now create a seismic geophone array as shown in FIGURE 2. Group B which previously was connected with array 20 now becomes connected in parallel with group A of former array 22 to form synthetic array 21. Thus a resultant signal from a second seismic impulse generated at the same first shot point synthesizes and creates an effective geophone station 15 which is intermediate original geophone stations 14 and 16. This is shown in FIGURE 3 as a dotted line and identified with the numeral 2. This same process is repeated for subsequent shot points, that is, SP-2 and SP-3 as shown in FIGURE 3. It will thus show that the seismic profiling of subsurface formations may be accomplished with greater close subsurface coverage than normally possible with seismic systems heretofore known.

The drilling and the forming of a particular shot point entails a great deal of time and expense with systems heretofore used that can now be eliminated in this system hence, a lesser number of shot points may be utilized resulting in greater efficiency, economy and effectiveness in the seismic profiling arts.

An alternate embodiment of this invention is further signified in FIGURE 3 in that even closer subsurface profiling may be accomplished by variably positioning the shot points relative to the fixed geophone stations 14, 16, 18, etc., when overlapping spreads are used. For example, SP-1 is shown as located one-third of the distance between geophone station 12 and geophone station 14, whereas SP-2 is shown as located two-thirds of the distance between the two geophone stations 18 and 20. Further SP-3 is shown as located at the given geophone stations. This variation in distance, however, may be at other spaced increments between given stations and can be cyclically repeated for the next adjacent series of shot points. It is to be understood that the varying shot point locations may be used either alone but preferably in combination with the switching geophone array system heretofore described and shown in FIGURES 1 and 2.

The data resulting from the described methods may include the usual corrections to compensate for geophone spread, geophone elevation differences, weathering, noise, etc. The seismic traces may be placed in their proper depth point sequence as is schematically illustrated in FIGURE 3. The numbered points represent separate recorded seismic traces.

This invention has been described with reference to specific and preferred embodiments. It will be apparent, however, that other modifications can be made without departing from the spirit and scope of the invention. Accordingly, this invention should be construed not to be limited to the embodiment herein described which should be limited only by the scope of the appended claims.

What is claimed:
1. A method of seismic surveying comprising:
positioning patterns of seismic geophones consisting of distinct groups of geophones at a plurality of substantially equally spaced stations in substantially a straight line along the surface of the earth,
each of said groups electrically connected to a recording circuit; then
  (1) electrically connecting adjacent of said groups in one direction along said line with each other
  (2) creating a seismic disturbance at a first point
  (3) recording reflections of said disturbance received from said connected groups resulting in a given set of first depth points
  (4) unconnecting said groups and connecting adjacent of said groups in the opposite direction along said line with each other
  (5) creating another seismic disturbance at the same said first point, and
  (6) recording reflections of said disturbance received from said connected groups resulting in a given set of second depth points intermediate said first depth points.

2. The method of claim 1 wherein said geophones in said group are electrically connected in series to said recording circuit.

3. The method of claim 1 wherein said adjacent groups are electrically connected in parallel with each other.

4. The method of claim 1 wherein said geophone in said groups are electrically connected in series to said recording circuit and said adjacent groups are electrically connected in parallel with each other.

5. A method according to claim 1 wherein said first point of seismic disturbance is intermediate of one of said stations.

6. A method according to claim 1 wherein said method is repeated at different points of seismic disturbance along said line.

7. A method according to claim 6 wherein said different points are not at the same relative intermediate location between centers of said stations as the location of said previous point of seismic disturbance.

References Cited

UNITED STATES PATENTS

| | | | |
|---|---|---|---|
| 3,105,568 | 10/1963 | Jolly | 181—.5 |
| 3,240,286 | 3/1966 | Musgrave | 181—.5 |
| 3,352,377 | 11/1967 | Cetrone et al. | 181—.5 |

BENJAMIN A. BORCHELT, *Primary Examiner.*

G. H. GLANZMAN, *Assistant Examiner.*